United States Patent
Uwazumi et al.

(10) Patent No.: US 6,667,116 B1
(45) Date of Patent: Dec. 23, 2003

(54) MAGNETIC RECORDING MEDIA, THE MANUFACTURING METHOD FOR THE SAME, AND MAGNETIC RECORDING DEVICE

(75) Inventors: Hiroyuki Uwazumi, Nagano (JP); Akira Saito, Nagano (JP); Tsuyoshi Onitsuka, Nagano (JP); Tadaaki Oikawa, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/559,955

(22) Filed: Apr. 27, 2000

(30) Foreign Application Priority Data

May 12, 1999 (JP) .............................. 11-130741

(51) Int. Cl.$^7$ .............................. G11B 5/66; G11B 5/70
(52) U.S. Cl. ................. 428/694 TS; 428/900; 428/336; 427/128; 427/131
(58) Field of Search .............. 428/694 TS, 900, 428/65.3, 336, 694 BM, 694 BS; 360/135; 427/128, 131; 204/192.1, 192.2

(56) References Cited

U.S. PATENT DOCUMENTS

| | | | | |
|---|---|---|---|---|
| 4,774,130 A | * | 9/1988 | Endo et al. | 428/216 |
| 5,650,889 A | * | 7/1997 | Yamamoto et al. | 360/97.01 |
| 5,679,473 A | | 10/1997 | Murayama et al. | |
| 5,815,342 A | * | 9/1998 | Akiyama et al. | 360/97.01 |
| 5,820,963 A | * | 10/1998 | Lu et al. | 428/65.3 |
| 6,086,977 A | * | 7/2000 | Suzuki et al. | 428/141 |

FOREIGN PATENT DOCUMENTS

JP 08-255342 1/1996

* cited by examiner

Primary Examiner—Holly Rickman
(74) Attorney, Agent, or Firm—Darby & Darby

(57) ABSTRACT

A magnetic recording medium which includes a non-magnetic base layer having layered upon it, in sequence, a non-magnetic middle layer and a magnetic layer. The magnetic layer has ferromagnetic crystal grains surrounded by non-magnetic grain boundaries. The non-magnetic middle layer is formed of a non-magnetic oxide or nitride, and is disposed between the non-magnetic base layer and the magnetic layer. The non-magnetic oxide or nitride in the middle layer forms a fine, island-like film. At the time of film formation of the granular magnetic layer on the middle layer, this island-like film performs stationing for the ferromagnetic crystal grains and the growth nucleus for the non-magnetic grain boundary. As a result, fine dispersion of the ferromagnetic crystal grains in the granular magnetic layer is hastened, and a high coercivity is obtained even with a small Pt composition ratio. The available reduction in Pt composition ratio reduces the cost of the magnetic recording medium. Controlling the film formation conditions to which the non-magnetic middle layer is exposed controls the dispersion structure and the like of the magnetic crystal grains in the magnetic layer. This, in turn, controls the magnetic properties and the electromagnetic conversion properties of the magnetic recording medium.

11 Claims, 2 Drawing Sheets

1: non-magnetic substrate
2: non-magnetic base layer
3: non-magnetic middle layer
4: magnetic layer
5: protective layer
6: liquid lubricant layer 1: non-magnetic substrate
2: non-magnetic base layer
3: non-magnetic middle layer
4: magnetic layer
5: protective layer
6: liquid lubricant layer Film Thickness of Cr Oxide Layer (nm)

MAGNETIC RECORDING MEDIA, THE MANUFACTURING METHOD FOR THE SAME, AND MAGNETIC RECORDING DEVICE

BACKGROUND OF THE INVENTION

The present invention relates to a magnetic recording medium, which is mounted on an external recording device and the like of a computer, and a manufacturing method for the same.

In magnetic recording media requiring high recording density and low noise, a variety of compositions and constructions for the magnetic layer and a variety of materials and the like for the non-magnetic base layer have been proposed in the prior art. Particularly in recent years, magnetic recording media, having a granular magnetic layer with a construction in which magnetic crystal grains are surrounded by a non-magnetic grain boundary of a non-magnetic oxide or nitride, have been proposed.

For example, in Japanese Laid-Open Patent Publication Number 8-255342, a medium is obtained by the following method: a non-magnetic film, a ferromagnetic film, and a non-magnetic film are layered in sequence on top of a substrate; next, by performing heat treatment at 400 degrees C or greater, the ferromagnetic crystal grains of the ferromagnetic film, which is interposed between non-magnetic films above and below, are dispersed to form a granular magnetic layer (recording layer). It is disclosed that the medium can achieve low noise. In this case, silicon oxide or nitride is used as the non-magnetic films. In addition, in U.S. Pat. No. 5,679,473, using a CoNiP target to which an oxide such as $SiO_2$ and the like has been added, RF sputtering is conducted. As a result, a medium is obtained, in which there is formed a granular magnetic layer having a construction, wherein magnetic crystal grains are surrounded by a non-magnetic oxide and are individually separated. It is disclosed that a high coercivity and low noise can be realized.

In these granular magnetic layers, the construction is one in which the crystal phase of a non-magnetic non-metal physically disperses the magnetic grains. As a result, it is thought that the low noise property is achieved because the magnetic interaction between magnetic grains is reduced, and the formation of zigzag magnetic domain walls generated in the transition region of the recording bits can be suppressed. With the CoCr metal magnetic layer used in the prior art, Cr is segregated from Co magnetic grains by forming the film at a high temperature, and this results in Cr being precipitated in the grain boundary, and the magnetic interaction between magnetic grains is reduced. However, with granular magnetic layers, because materials of non-magnetic non-metals are used as the grain boundary phase, they are more easily segregated as compared to the Cr of the prior art, and the isolation of the magnetic grains can be comparatively easily accelerated. In particular, with the CoCr metal magnetic layer of the prior art, heating of the substrate temperature to 200 degrees C or greater, prior to film formation, is a requirement for adequate segregation of Cr. In contrast, with a granular magnetic layer, as in the above described U.S. Pat. No. 5,679,473, it has an advantage of the non-magnetic non-metal substance being segregated even without heating prior to film formation.

However, the magnetic recording media with the above granular magnetic layer have the following problems.

(1) Even though a magnetic recording media having a granular magnetic layer can have low noise, in order to have the desired magnetic property and especially a strong coercivity Hc, a relatively large amount of Pt must be added to the Co alloy. Even with the above described U.S. Pat. No. 5,679,473, in order to have a coercivity of around 2400 Oe, an expensive Pt of 11 atomic % is needed. In contrast, in order to have a similar coercivity with the Co metal magnetic layer of the prior art, a Pt of, at most, only around 5 atomic % is required. In recent years, in conjunction with increasing magnetic recording density, an extremely high coercivity of 3000 Oe or greater has been demanded. When this is considered, magnetic recording media with a granular magnetic layer requiring large amounts of expensive Pt invites increasing costs.

(2) In addition, with the granular magnetic layer, the fine construction, and especially the grain boundary segregation construction, is mainly determined by the amount of non-magnetic non-metal substances in its magnetic layer. It became clear from research by the present inventors that its properties are relatively insensitive to the film formation process. In contrast, with the CoCr alloy magnetic layer of the prior art, the segregation construction can be controlled mainly by the substrate heating temperature during the film formation process. As a result, even with the same composition, it is relatively easy to control the magnetic property and the electromagnetic conversion property through the film formation process.

OBJECTS AND SUMMARY OF THE PRESENT INVENTION

Upon considering each of the above problems, it is an object of the present invention to provide a magnetic recording medium having a granular magnetic layer, in which a high coercivity can be achieved with a small Pt composition ratio, costs can be reduced, and a degree of freedom in controlling its properties through the film formation process is available.

In order to solve the above problems, the present invention provides a magnetic recording medium having at least a non-magnetic base layer and a magnetic layer layered in this sequence on top of a non-magnetic substrate, wherein the magnetic layer comprises ferromagnetic crystal grains and a surrounding non-magnetic grain boundary; a non-magnetic middle layer, comprising non-magnetic oxide or nitride, is formed between the non-magnetic base layer and the magnetic layer.

The magnetic layer of the present invention is a granular magnetic layer, having crystal grains with ferromagnetism and a non-magnetic grain boundary which surrounds these grains. Prior to forming this granular magnetic layer, a non-magnetic middle layer, comprising a non-magnetic oxide or nitride, is formed on top of the non-magnetic base layer. The non-magnetic oxide or nitride can form a fine, island-like film. At the time of film formation of the granular magnetic layer, this island-like film becomes the stationing for the ferromagnetic crystal grains and the growth nuclei for the non-magnetic grain boundary. As a result, fine dispersion of the ferromagnetic crystal grains in the granular magnetic layer is hastened, and a high coercivity can be obtained even with a small Pt composition ratio. A low cost magnetic recording medium with a granular magnetic layer can be provided. In addition, by controlling the film formation conditions (gas pressure and the like) of the non-magnetic middle layer, which acts as the base for the granular magnetic layer, the dispersion structure and the like of the magnetic crystal grains can be controlled, and the magnetic properties and the electromagnetic conversion properties can be controlled.

In order to form the non-magnetic middle layer, comprising a non-magnetic oxide or nitride, into an island-like film, the thickness of the film must be small. If the film is too thick, it develops from an island-like film into a continuous film. If the film thickness is 13 nm or less, it does not develop into a continuous film, and a high coercivity is achieved. Of course if the film is too thin, an adequate island-like film is not formed. Preferably, with a thickness from about 1to about 10 nm, an extremely high coercivity can be achieved. More preferably, with a thickness from about 2 to about 5 nm, a high coercivity of around 3000 Oe can be achieved.

The island-like construction of the non-magnetic layer contributes to planar fine partitioning. For the magnetic layer which is formed above it, this island-like construction is thought to take on the role as a stationing for the ferromagnetic crystal grains and as a growth nucleus for the non-magnetic crystal boundaries. In order to develop more fully the function as the growth nucleus for the non-magnetic grain boundary, the oxide or nitride which forms the non-magnetic middle layer is preferably the same as the substance of the non-magnetic grain boundary contained in the magnetic layer. In so doing, a higher coercivity can be achieved.

A non-magnetic grain boundary contained in the magnetic layer preferably comprises an oxide or nitride of at least one element selected from the group consisting of Cr, Co, Si, Al, Ti, Ta, Hf, and Zr. Furthermore, carbides are also possible. In addition, for the substance which forms the non-magnetic middle layer, carbides can similarly be used. In addition, ferromagnetic crystal grains contained in the magnetic layer preferably comprise an alloy in which at least one element selected from the group consisting of Cr, Ni, and Ta is added to CoPt alloy.

Furthermore, the non-magnetic base layer preferably comprises Cr or a Cr alloy. For the non-magnetic substrate, crystallized glass and chemical strengthened glass can be used of course, but in addition, plastics can also be used. This is because the film formation of the granular magnetic layer can be conducted without prior heating of the substrate.

The manufacturing method for the magnetic recording medium with the above construction comprises: a process for forming the non-magnetic base layer on top of the non-magnetic substrate which has not been heated beforehand; a process for forming an island-like film, comprising non-magnetic oxide or nitride, on top of the non-magnetic base layer; a process for forming a magnetic layer, having ferromagnetic crystal grains and a non-magnetic grain boundary which surrounds these grains, on top of the island-like film. Because prior heating is not conducted, a plastic can be used as the substrate.

In addition, the method for manufacturing the magnetic recording medium of the present invention comprises: a process for forming the non-magnetic base layer on top of the non-magnetic substrate; a process for forming the island-like film, comprising non-magnetic oxide or nitride, on top of the non-magnetic base layer by reactive sputtering in a mixture gas atmosphere of oxygen or nitrogen gas mixed in Ar gas; a process for forming a magnetic layer, having ferromagnetic crystal grains and a non-magnetic grain boundary which surrounds these grains, on top of the island-like film. With regard to the gas pressure for this mixture gas, if it is 15 mTorr or greater, the oxide or nitride can be formed stably, and a high coercivity can be achieved. Furthermore, if the mixture gas pressure is 20 to 40 mTorr, a high coercivity can be achieved.

Briefly stated, the present invention provides a magnetic recording medium which includes a non-magnetic base layer having layered upon it, in sequence, a non-magnetic middle layer and a magnetic layer. The magnetic layer has ferromagnetic crystal grains surrounded by non-magnetic grain boundaries. The non-magnetic middle layer is formed of a non-magnetic oxide or nitride, and is disposed between the non-magnetic base layer and the magnetic layer. The non-magnetic oxide or nitride in the middle layer forms a fine, island-like film. At the time of film formation of the granular magnetic layer on the middle layer, this island-like film performs stationing for the ferromagnetic crystal grains and the growth nucleus for the non-magnetic grain boundary. As a result, fine dispersion of the ferromagnetic crystal grains in the granular magnetic layer is hastened, and a high coercivity is obtained even with a small Pt composition ratio. The available reduction in Pt composition ratio reduces the cost of the magnetic recording medium. Controlling the film formation conditions to which the non-magnetic middle layer is exposed controls the dispersion structure and the like of the magnetic crystal grains in the magnetic layer. This, in turn, controls the magnetic properties and the electromagnetic conversion properties of the magnetic recording medium.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
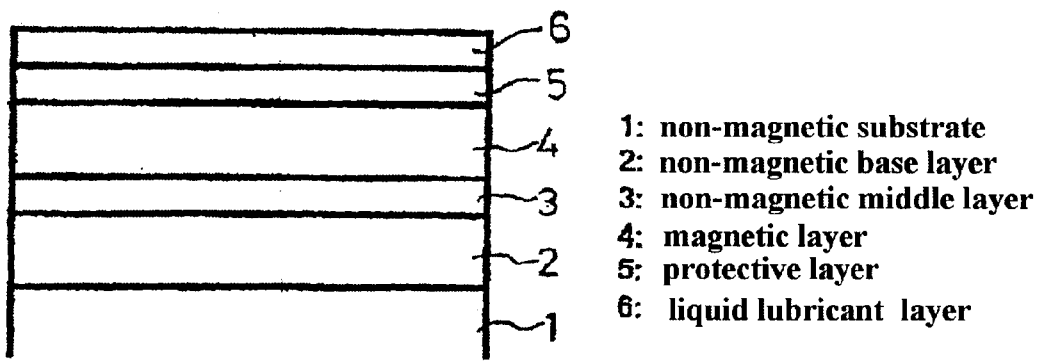
FIG. 1 is a model-type cross-section showing the layer construction of the magnetic recording medium of an embodiment of the present invention.

Referring to FIG. 1, a model-type cross-section shows the layer construction of the magnetic recording medium of an embodiment. In the magnetic recording medium of this example, there is a layer construction in which a non-magnetic base layer 2, a non-magnetic middle layer 3 comprising a non-magnetic oxide or nitride, a granular magnetic layer 4 comprising ferromagnetic crystal grains and surrounding non-magnetic grain boundaries, a protective layer 5, and a liquid lubricant layer 6 are layered in sequence on top of a non-magnetic substrate 1.

Embodiment 1

Crystallized glass with a smooth surface was used as non-magnetic substrate 1. After washing, substrate 1 was introduced inside a sputter chamber. Under an Ar gas pressure of 5 mTorr, non-magnetic base layer 2 of pure Cr with a film thickness of 15 nm was formed. Next, in a mixture gas (Ar+10% $O_2$) atmosphere of mixture gas pressure 20 mTorr, non-magnetic middle layer 3 of Cr oxide ($Cr_2O_3$) was formed by reactive sputtering of the Cr target. Next, under an Ar gas pressure of 5 mTorr, granular magnetic layer 4 was formed by RF sputtering method. Granular magnetic layer 4 has ferromagnetic crystal grains of a Co alloy ($CoCr_{12}Pt_{12}$) and a surrounding non-magnetic grain boundary of a Cr oxide ($Cr_2O_3$) at a composition ratio of 9:1. Next, protective layer 5 of carbon was formed on top of magnetic layer 4. Afterwards, the thus-formed assembly was removed from the vacuum. A liquid lubricant was coated on the surface to form liquid lubricant layer 6. This process formed the magnetic recording medium. As described later, the film thickness of Cr oxide layer 3 and the gas pressure at the time of film formation were varied. No heating of the substrate prior to the film formation was conducted. It is estimated that the substrate temperature at the time of sputtering was around 70–80 degrees C. The sputtering conditions were a direct current power of 1 KW with no direct current bias.

Figure 2:
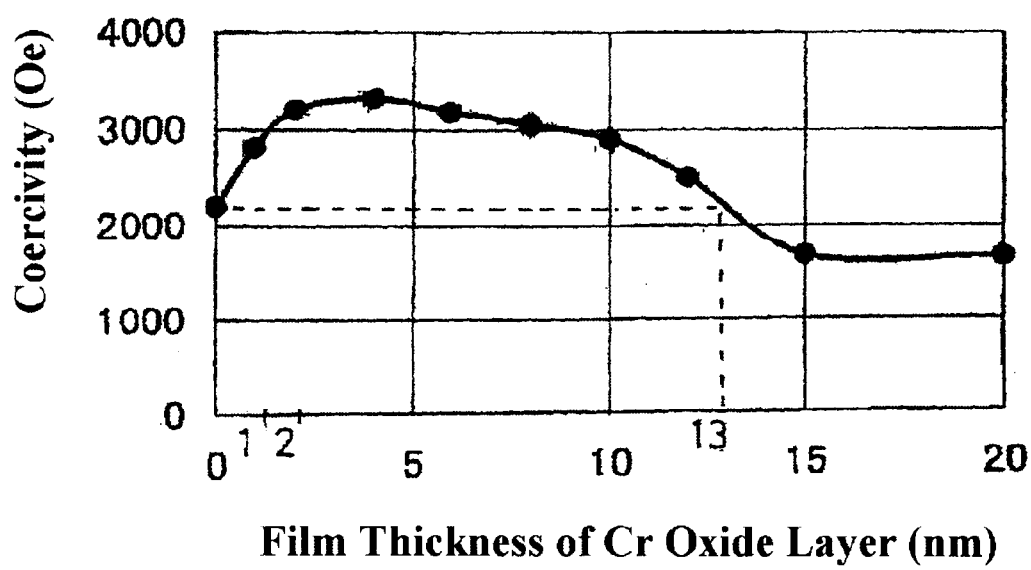
FIG. 2 is a graph showing the relationship between the film thickness (nm) of the Cr oxide layer and coercivity Hc (Oe) of the medium of Embodiment 1.

Referring to FIG. 2, the relationship between the film thickness (nm) of the Cr oxide layer and coercivity Hc (Oe) of the medium is shown. As is clear from this figure, compared to when Cr oxide layer 3 was not formed (film thickness of 0), when Cr oxide layer was thinly formed, coercivity Hc greatly increased. As the film thickness increased, coercivity Hc decreased. From the fact that the coercivity was approximately 2100 Oe when film thickness was 0, if Cr oxide layer 3 is set at a film thickness of 13 nm or less, a coercivity of 2100 Oe or greater is achieved. When the film thickness was between 1–10 nm, a high coercivity of around 3000 Oe was achieved. Furthermore, with a film thickness from about 2 and 5 nm, a peak coercivity of around 3200 Oe was achieved. It was confirmed that, within these ranges of film thicknesses, an island-like Cr oxide layer 3 was formed.

Figure 3:
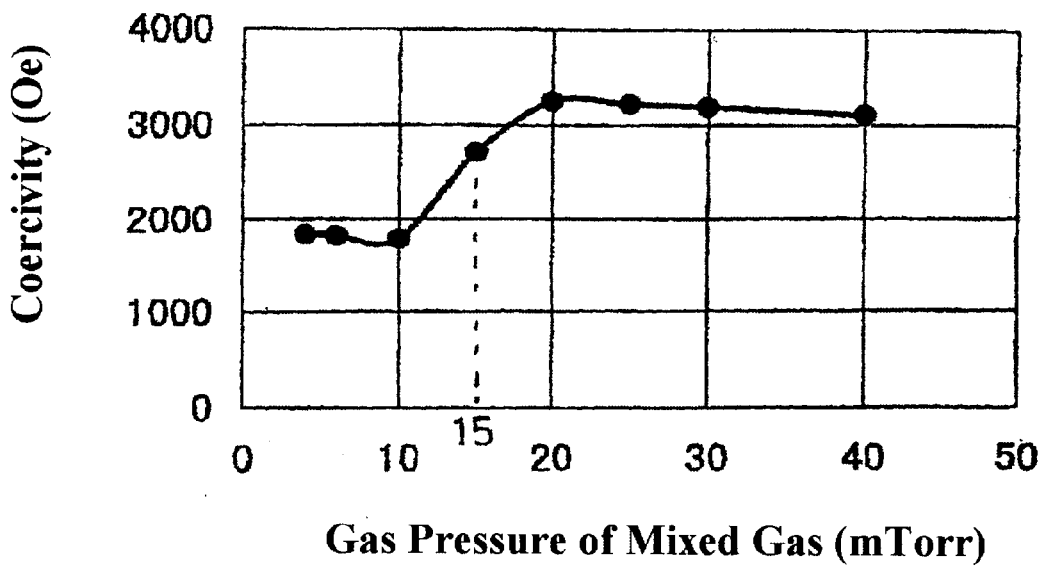
FIG. 3 is a graph showing the dependence of coercivity Hc on the gas pressure of the mixture gas (Ar+10% $O_2$) at the time of film formation, when film thickness of Cr oxide layer is fixed at 3 nm in Embodiment 1.

Referring to FIG. 3, the film thickness of the Cr oxide layer was fixed at 3 nm, and the dependence of coercivity Hc on the gas pressure of the mixture gas (Ar+10% $O_2$) at the time of film formation is shown. From this figure, when the gas pressure is low in the range (10 mTorr or below) where the Cr oxide is not easily formed in a stable manner, the coercivity is around 2000 Oe, and the significance of the Cr oxide layer is not seen. But at 15 mTorr or greater, a high coercivity can be achieved. Referring to FIG. 3, the mixture gas pressure is changed only up to a maximum of 40 mTorr, but when the gas pressure was increased more, a gradual decrease in the coercivity was seen. This decrease is thought to be because the reactivity was inhibited. Preferably, a pressure to about 20 and 40 mTorr yields a high coercivity.

Embodiment 2

In the present example, as the oxide for non-magnetic middle layer 3, Cr oxide or Si oxide was formed in a mixture gas (Ar+10% $O_2$) atmosphere of gas pressure 20 mTorr by reactive sputtering with a Cr target. Granular magnetic layer 4, having ferromagnetic crystal grains of Co alloy ($CoCr_{12}Pt_{12}$) and the non-magnetic crystal boundary of Si oxide ($SiO_2$) at a composition ratio of 9:1, was formed. All of the other conditions were the same as Embodiment 1.

Figure 4:
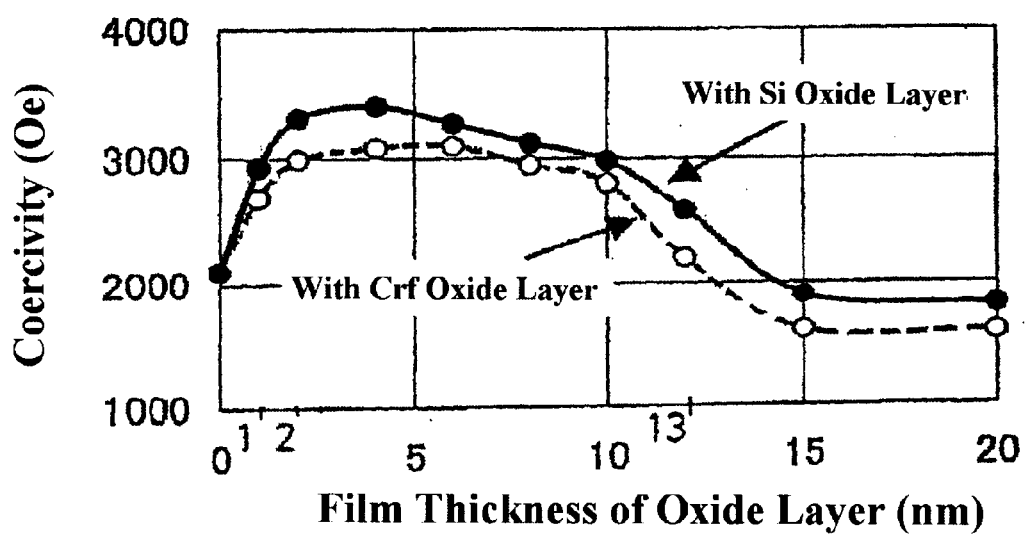
FIG. 4 is a graph showing the relationship between the film thickness (nm) of the Cr oxide and the Si oxide and coercivity Hc (Oe) of the medium in Embodiment 2.

Referring to FIG. 4, the relationship between film thickness (nm) of Cr oxide layer and the Si oxide layer and coercivity Hc (Oe) of the medium is shown. From this figure, with either the oxide layer of Cr oxide layer or Si oxide layer, both had a maximum coercivity in the approximately similar range of thin film thicknesses. In both cases, when the film thickness was 13 nm or less, a coercivity of 2000 Oe or greater was achieved. Preferably, with a thickness from about 1 to about 10 nm, a coercivity of around 3000 Oe was achieved. Most preferably, in the range from about 2 to about 5 nm, peak coercivity of 3000 Oe or greater was achieved.

Comparing Cr oxide and Si oxide layer, the Si oxide layer had a higher coercivity at all film thicknesses. The Si oxide layer and the Si oxide that forms the non-magnetic grain boundary of the granular magnetic layer 4 above the Si oxide layer are of the same substance ($SiO_2$). With the Cr oxide layer of the present example, the coercivity is slightly lower than that of Embodiment 1. In the case of Embodiment 1, the Cr oxide layer and the Cr oxide that forms the non-magnetic grain boundary of granular magnetic layer 4 above the Cr oxide layer are the same substance ($Cr_2O_3$). Because the oxide layer functions as the growth nucleus for the non-magnetic grain boundary in granular magnetic layer 4 which is the layer above it, it is preferable to have the oxide layer be the same substance as the non-magnetic grain boundary contained in the magnetic layer. In this case, a higher coercivity can be achieved.

As the non-magnetic grain boundary for granular magnetic layer 4, not only Cr oxide and Si oxide, but also non-magnetic Cr nitrides and Si nitrides can be used. In addition, oxides or nitrides of Co, Al, Ti, Ta, Hf, Zr, and the like can also be used. For the ferromagnetic crystal grains, other than CoCrPt alloy, an alloy, in which at least one element selected from the group consisting of Cr, Ni, and Ta is added to a CoPt alloy, can also be used. For non-magnetic base layer 2, in addition to pure Cr, a Cr alloy can also be used. For non-magnetic substrate 1, in addition to crystallized glass, chemically strengthened glass can be used of course. Even plastic can be used, because heat resistance is not strongly required since prior heating is unnecessary.

As described above, the present invention has a non-magnetic middle layer, comprising a non-magnetic oxide or nitride, formed on top of a non-magnetic base layer. On top of this, a granular magnetic layer is formed. The following advantages are seen.

(1) Because a fine island-like film of non-magnetic oxide or nitride is formed, at the time of film formation, this island-like film acts as a stationing for the ferromagnetic crystal grains and as the growth nucleus for the non-magnetic grain boundary. As a result, this accelerates the fine dispersion of the ferromagnetic crystal grains within the granular magnetic layer. A high coercivity can be achieved even with a small Pt composition ratio. A low cost magnetic recording medium with a granular magnetic layer can be provided. Furthermore, by controlling the film formation conditions of the non-magnetic middle layer, comprising an oxide or nitride, the dispersion structure and the like of the magnetic crystal grains can be controlled, and the magnetic properties and electromagnetic conversion properties can be controlled. Furthermore, film formation can be accomplished without conducting prior heating of the substrate, and as a result, plastic can be used as the substrate. If the film thickness of the non-magnetic middle layer is 13 nm or less, it does not develop into a continuous film, and a high coercivity is achieved. Preferably, with a film thickness from about 1 to about 10 nm, and an extremely high coercivity can be achieved. Most preferably, with a film thickness from about 2 to about 5, a high coercivity of around 3000 Oe is obtained.

(2) The manufacturing method of the magnetic recording medium of the present invention comprises a process for forming a non-magnetic base layer on top of a non-magnetic substrate; a process for forming an island-like film, comprising an oxide or a nitride, on top of the non-magnetic base layer by reactive sputtering in a mixture gas atmosphere of oxygen or nitrogen gas mixed in Ar gas; a process for forming a magnetic layer, having ferromagnetic crystal grains and surrounding non-magnetic grain boundary, on top of the island-like film. If the gas pressure of the mixture gas is 15 mTorr or greater, the oxide or nitride can be formed stably, and a high coercivity can be achieved. Furthermore, if the mixture gas pressure is from about 20 to about 40, a high coercivity can be achieved.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A magnetic recording medium, comprising:
    a non-magnetic substrate;
    a non-magnetic base layer on said non-magnetic substrate;
    a non-magnetic middle layer having a film thickness from about 2 to about 5 nm on said non-magnetic base layer and having an island-like structure;
    said non-magnetic middle layer consisting of a non-magnetic oxide or nitride;
    a magnetic layer layered on said non-magnetic middle layer;
    said magnetic layer being ferromagnetic crystal grains with non-magnetic grain boundaries surrounding said crystal grains; and
    said non-magnetic oxide or nitride which forms said non-magnetic middle layer is the same substance as the material forming said non-magnetic grain boundaries in said magnetic layer.

2. A magnetic recording medium as described in claim 1, wherein said non-magnetic grain boundaries contained in said magnetic layer consist of a non-magnetic oxide or nitride of at least one element selected from the group consisting of Cr, Co, Si, Al, Ti, Ta, Hf, and Zr.

3. A magnetic recording medium as described in claim 1, wherein said ferromagnetic crystal grains in said magnetic layer include a CoPt alloy with which is alloyed at least one element selected from the group consisting of Cr, Ni, and Ta.

4. A magnetic recording medium as described in claim 1, wherein said non-magnetic substrate is one of a crystalline glass, chemical strengthened glass, or plastic.

5. A method for manufacturing a magnetic recording medium, comprising:
    forming a non-magnetic base layer on top of a non-magnetic substrate;
    forming a non-magnetic middle layer having a film thickness of from about 2 to about 5 nm and including an island-like film consisting of a non-magnetic oxide or nitride, on top of said non-magnetic base layer; and
    forming a magnetic layer, which has ferromagnetic crystal grains and a surrounding non-magnetic grain boundary, on top of said island-like film, wherein said non-magnetic oxide or nitride which forms said non-magnetic middle layer is the same substance as the material forming said non-magnetic grain boundaries in said magnetic layer.

6. A manufacturing method according to claim 5, wherein said substrate is not heated.

7. A method for manufacturing a magnetic recording medium, comprising:
    forming a non-magnetic base layer on a non-magnetic substrate;
    forming a non-magnetic middle layer having a film thickness of from about 2 to about 5 nm and which includes an island-like film consisting of a non-magnetic oxide or nitride, on said non-magnetic base layer by reactive sputtering in a mixture gas atmosphere in which oxygen or nitrogen gas is mixed with Ar gas; and
    forming a magnetic layer, which has ferromagnetic crystal grains and a surrounding non-magnetic grain boundary, on said island-like film.

8. A magnetic recording device in which is mounted a magnetic recording medium as described in claim 1.

9. A magnetic recording device in which is mounted a magnetic recording medium made by a process as described in claim 5.

10. A magnetic recording device in which is mounted a magnetic recording medium made by a process as described in claim 7.

11. A magnetic recording medium, comprising:
    a non-magnetic substrate;
    a non-magnetic base layer on said non-magnetic substrate;
    a non-magnetic middle layer on said non-magnetic base layer;
    said non-magnetic middle layer consisting of a non-magnetic oxide or nitride and having an island-like structure;
    a magnetic layer layered on said non-magnetic middle layer;
    said magnetic layer being ferromagnetic crystal grains with non-magnetic grain boundaries surrounding said crystal grains;
    said non-magnetic oxide or nitride which forms said non-magnetic middle layer is the same substance as the material forming said non-magnetic grain boundaries in said magnetic layer;
    said non-magnetic middle layer having a film thickness; and
    said film thickness of said non-magnetic middle layer being from about 2 to about 8 nm.

* * * * *